United States Patent
Pai et al.

(10) Patent No.: US 11,347,492 B2
(45) Date of Patent: May 31, 2022

(54) SOFTWARE DEPLOYMENT CONTROL USING BLOCKCHAIN

(71) Applicant: SAP SE, Walldorf (DE)

(72) Inventors: Harihar Pai, Bangalore (IN); Kavitha Alagesan, Bangalore (IN); Nagendra Reddy Devireddy, Bangalore (IN)

(73) Assignee: SAP SE, Walldorf (DE)

( * ) Notice: Subject to any disclaimer, the term of this patent is extended or adjusted under 35 U.S.C. 154(b) by 162 days.

(21) Appl. No.: 16/802,203

(22) Filed: Feb. 26, 2020

(65) Prior Publication Data

US 2021/0263719 A1 Aug. 26, 2021

(51) Int. Cl.
| | |
|---|---|
| G06F 9/445 | (2018.01) |
| G06F 8/61 | (2018.01) |
| H04L 9/06 | (2006.01) |
| G06F 16/182 | (2019.01) |
| H04L 67/00 | (2022.01) |

(52) U.S. Cl.
CPC ............ G06F 8/61 (2013.01); G06F 16/1837 (2019.01); H04L 9/0637 (2013.01); H04L 9/0643 (2013.01); H04L 67/34 (2013.01)

(58) Field of Classification Search
CPC ........................................................ G06F 8/61
USPC ........................................................ 717/177
See application file for complete search history.

(56) References Cited

U.S. PATENT DOCUMENTS

| | | | | |
|---|---|---|---|---|
| 10,809,992 | B1* | 10/2020 | Kondo | G06F 11/3692 |
| 2007/0162894 | A1* | 7/2007 | Noller | G06F 11/3684 |
| | | | | 717/124 |
| 2018/0157583 | A1* | 6/2018 | Bache | G06F 11/3688 |
| 2020/0242591 | A1* | 7/2020 | Sevindik | G06Q 20/32 |

FOREIGN PATENT DOCUMENTS

EP 3687107 A1 * 7/2020 ........... H04L 9/3247

* cited by examiner

*Primary Examiner* — Evral E Bodden
(74) *Attorney, Agent, or Firm* — Mintz Levin Cohn Ferris Glovsky and Popeo, P.C.

(57) ABSTRACT

A method for controlling the deployment of a software application may include responding to a user committing a programming code implementing the software application by determining whether the programming code passed a plurality of tests required for deploying the programming code to a production system. In response to determining that the programming code passed the plurality of tests, one or more blocks indicating that the programming code has passed the plurality of tests may be inserted into a blockchain. The programming code may be deployed to the production system. The deploying of the programming code may include traversing the blockchain to verify a presence of the one or more blocks in the blockchain. Related systems and articles of manufacture, including computer program products, are also provided.

16 Claims, 7 Drawing Sheets

SOFTWARE DEPLOYMENT CONTROL USING BLOCKCHAIN

TECHNICAL FIELD

The present disclosure generally relates to software configuration management and, more specifically, to blockchain based software deployment controls.

BACKGROUND

The operations of many organizations may rely on a suite enterprise software applications including, for example, enterprise resource planning (ERP) software, customer relationship management (CRM) software, and/or the like. These enterprise software applications may provide a variety of functionalities including, for example, billing, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely from multiple clients (e.g., a web browser and/or the like). Moreover, one or more customizations may be applied to an enterprise software application prior to being deployed to the cloud-computing platform such that the functionalities associated with the customized enterprise software application are also remotely accessible from one or more clients.

SUMMARY

Methods, systems, and articles of manufacture, including computer program products, are provided for blockchain based software deployment controls. In one aspect, there is provided a system including at least one processor and at least one memory. The at least one memory can store instructions that cause operations when executed by the at least one processor. The operations may include: in response to a first user committing a first programming code, determining whether the first programming code passed a plurality of tests required for deploying the first programming code to a production system; in response to determining that the first programming code passed the plurality of tests, inserting, into a blockchain, one or more blocks indicating that the first programming code has passed the plurality of tests required for deploying the first programming code to the production system; and deploying, to the production system, the first programming code, the deploying of the first programming code includes traversing the blockchain to verify a presence of the one or more blocks in the blockchain.

In some variations, one or more of the features disclosed herein including the following features can optionally be included in any feasible combination. In response to determining that the first programming code has passed a first test required for deploying the first programming code to the production system, a first block may be inserted into the blockchain. A second block may be inserted into the blockchain in response to determining that the first programming code has passed a second test required for deploying the first programming code to the production system.

In some variations, the first test may be a prerequisite for the second test. The second block may be inserted into the blockchain further in response to verifying that the first block corresponding to the first test is present in the blockchain.

In some variations, each of the plurality of blocks may include a commit identifier identifying the first programming code and/or a version of the first programming code. The traversing of the blockchain may include identifying, based at least on the commit identifier, the one or more blocks that are associated with the first programming code and/or the version of the first programming code.

In some variations, each block in the blockchain may be cryptographically linked to a preceding block by including a hash value corresponding to at least a portion of a content of the preceding block.

In some variations, the plurality of tests may include one or more compilation tests, unit tests, runtime tests, static code tests, and/or style tests.

In some variations, the plurality of tests may be performed at a development system associated with the first programming code.

In some variations, the blockchain may further include one or more blocks corresponding to a second programming code associated with a second user.

In some variations, the first programming code may implement a software application, a customization of the software application, and/or an update to the software application.

In another aspect, there is provided a method for blockchain based software deployment controls. The method may include: in response to a first user committing a first programming code, determining whether the first programming code passed a plurality of tests required for deploying the first programming code to a production system; in response to determining that the first programming code passed the plurality of tests, inserting, into a blockchain, one or more blocks indicating that the first programming code has passed the plurality of tests required for deploying the first programming code to the production system; and deploying, to the production system, the first programming code, the deploying of the first programming code includes traversing the blockchain to verify a presence of the one or more blocks in the blockchain.

In some variations, one or more of the features disclosed herein including the following features can optionally be included in any feasible combination. The method may further include: inserting, into the blockchain, a first block in response to determining that the first programming code has passed a first test required for deploying the first programming code to the production system; and inserting, into the blockchain, a second block in response to determining that the first programming code has passed a second test required for deploying the first programming code to the production system.

In some variations, the first test may be a prerequisite for the second test. The second block may be inserted into the blockchain further in response to verifying that the first block corresponding to the first test is present in the blockchain.

In some variations, each of the plurality of blocks may include a commit identifier identifying the first programming code and/or a version of the first programming code. The traversing of the blockchain may include identifying, based at least on the commit identifier, the one or more blocks that are associated with the first programming code and/or the version of the first programming code.

In some variations, each block in the blockchain may be cryptographically linked to a preceding block by including a hash value corresponding to at least a portion of a content of the preceding block.

In some variations, the plurality of tests may include one or more compilation tests, unit tests, runtime tests, static code tests, and/or style tests.

In some variations, the plurality of tests may be performed at a development system associated with the first programming code.

In some variations, the blockchain may further include one or more blocks corresponding to a second programming code associated with a second user.

In another aspect, there is provided a computer program product that includes a non-transitory computer readable medium. The non-transitory computer readable medium may store instructions that cause operations when executed by at least one data processor. The operations may include: in response to a first user committing a first programming code, determining whether the first programming code passed a plurality of tests required for deploying the first programming code to a production system; in response to determining that the first programming code passed the plurality of tests, inserting, into a blockchain, one or more blocks indicating that the first programming code has passed the plurality of tests required for deploying the first programming code to the production system; and deploying, to the production system, the first programming code, the deploying of the first programming code includes traversing the blockchain to verify a presence of the one or more blocks in the blockchain.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to software deployment controls using blockchain, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
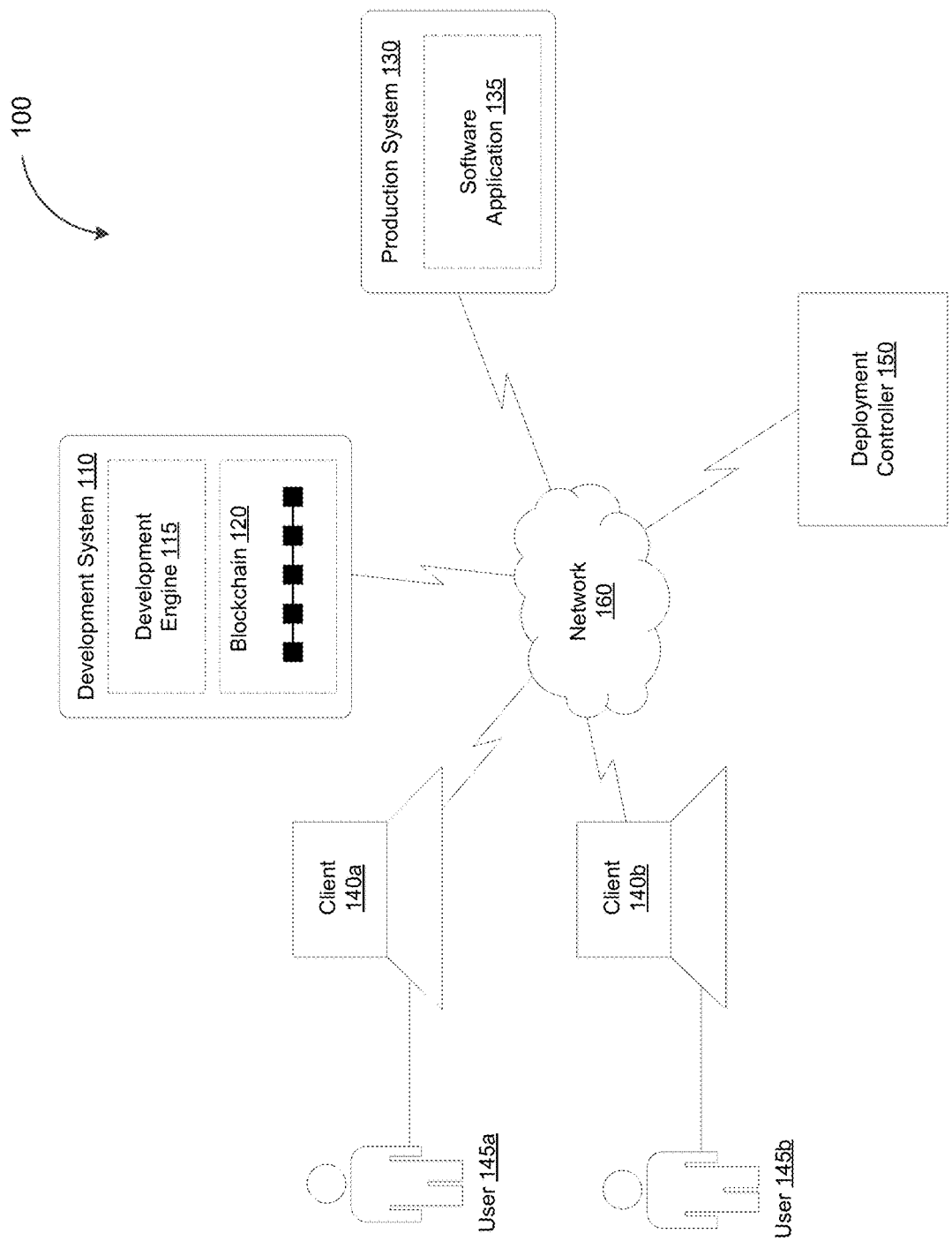
FIG. 1 depicts a system diagram illustrating a blockchain based software production system, in accordance with some example embodiments.

When practical, like labels are used to refer to same or similar items in the drawings.

DETAILED DESCRIPTION

The development lifecycle of an enterprise software application and/or updates to the enterprise software application may include a sequence of stages including, for example, development, testing, acceptance, production, and/or the like. For example, an end user may develop, on a development system, programming code implementing the enterprise software application. The programming code implementing the enterprise software application may undergo a battery of tests before being deployed to a production system, such as a cloud-computing platform, where the enterprise software application may be accessed for use by multiple clients. For instance, the programming code implementing the enterprise software application may be tested in a test environment that closely mimics the end user's production system. The programming code implementing the enterprise software application may be subject to further testing in an acceptance test environment.

Testing the programming code implementing the enterprise software application at a remote testing environment may consume an excessive quantity of resources, especially when the programming code undergoes multiple iterations of modifications prior to passing the requisite testing. Accordingly, in some example embodiments, the testing of the programming code implementing an enterprise software application may be performed at a development system. Moreover, a blockchain may being maintained at the development system in order to track the testing of the programming code.

In some example embodiments, each block in the blockchain may identify a test that is passed by the programming code. For example, in order to be deployed to the production system, the programming code may be required to pass a first test before passing a second test. As such, a first block may be added to the blockchain in response to the programming code passing the first test before a second block may be added to the blockchain to indicate the programming code as having passed the second test. A deployment controller may determine whether the programming code may be deployed to the production system by at least traversing the blockchain to identify one or more blocks in the blockchain indicating that the programming code has passed the tests required for deployment. For instance, the deployment controller traversing the blockchain may determine, based at least on the presence of the second block associated with the programming code having passed the second test, that the programming code may be deployed to the production system.

FIG. 1 depicts a system diagram illustrating a blockchain based software production system 100, in accordance with some example embodiments. Referring to FIG. 1, the blockchain based software production system 100 may include a development system 110, a production system 130, a first client 140a, a second client 140b, and a deployment controller 150. As shown in FIG. 1, the development system 110, the production system 130, the first client 140a, the second client 140b, and the deployment controller 150 may be communicatively coupled via a network 160. The network 160 may be a wired and/or wireless network including, for example, a wide area network (WAN), local area network (LAN), a virtual local area network (VLAN), the Internet, and/or the like. The first client 140a and the second client 140b may each be a processor-based device including, for example, a smartphone, a tablet computer, a wearable apparatus, a virtual assistant, an Internet-of-Things (IoT) appliance, and/or the like.

In some example embodiments, prior to being deployed to the production system 130, programming code associated with a software application 135 may be developed and tested at the development system 110. The software application 135 may be an enterprise software application (e.g., an enterprise resource planning (ERP) software application, a customer relationship management (CRM) software application, and/or the like) providing a variety of functionalities including, for example, billing, invoicing, procurement, payroll, time and attendance management, recruiting and onboarding, learning and development, performance and compensation, workforce planning, and/or the like. However, it should be appreciated that the software application 135 may be any type of software application. Moreover, the development of the software application 135 may include developing one or more customizations and/or updates to the software application 135. Once deployed to the production system 130, which may be a cloud-based platform, the functionalities of the software application 135 may be accessible for use from multiple clients including, for example, the first client 140a, the second client 140b, and/or the like.

Referring again to FIG. 1, the development system 110 may include a development engine 115 and a blockchain 120. In some example embodiments, the development engine 115 may traverse and/or update the blockchain 120 in order to track the testing of the programming code implementing the software application 135. For example, each block in the blockchain 120 may include content identifying a test that is passed by the programming code. In order to be deployed to the production system 130, the programming code may be required to pass a first test as well as a second test. As such, a first block may be added to the blockchain 120 in response to the programming code passing the first test and a second block may be added to the blockchain 120 to indicate the programming code as having passed the second test. In instances where passing the first test is a prerequisite for the second test (e.g., the programming code being required to pass the first test before the second test), the development engine 115 may add the second block corresponding to the second test to the blockchain 120 further in response to verifying the presence of the first block corresponding to the first test in the blockchain 120.

In some example embodiments, the deployment controller 150 may determine whether the programming code implementing the software application 135 may be deployed to the production system 130 by at least traversing the blockchain 120 to identify one or more blocks in the blockchain 120 indicating that the programming code has passed the tests required for deployment. For example, the deployment controller 150 traversing the blockchain 120 may determine, based at least on the presence of the second block associated with the programming code having passed the second test, that the programming code may be deployed to the production system 130.

Figure 2:
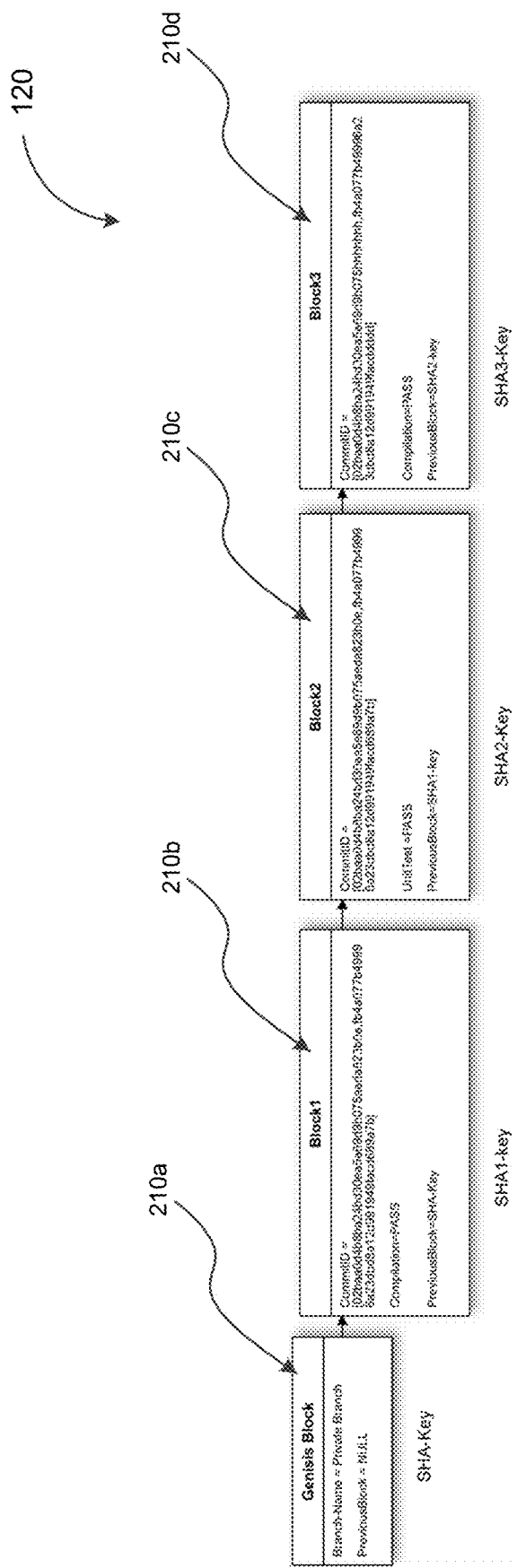
FIG. 2 depicts an example of a blockchain, in accordance with some example embodiments.

FIG. 2 depicts an example of the blockchain 120, in accordance with some example embodiments. As shown in FIG. 2, the blockchain 120 may include a series of blocks including, for example, a first block 210a, a second block 210b, a third block 210c, a fourth block 210d, and/or the like. In the example shown in FIG. 2, the first block 210a may be a genesis block identifying a branch of the blockchain 120. A single branch of the blockchain 120 may include blocks tracking the testing of one or more versions of the programming code, each of which including one or more customizations and/or updates to the software application 135. To enable differentiation between different versions of the programming code, each version of the programming code may be associated with a unique commit identifier. The contents of a block in the blockchain 120 may include a commit identifier as well as an indication of the test passed by the programming code associated with the commit identifier. Examples of information included in and/or used to generate a commit identifier are shown in Table 1 below.

TABLE 1 git show fb4a077b49996a23dbd8a12d991949facd689a7b
commit fb4a077b49996a23dbd8a12d991949facd689a7b
Author: i312250 <harihar.pai@sap.com>
Date: Tue Feb 4 16:09:11 2020 +0530
    Adding the new file
diff --git a/Hello/World.java b/Hello/World.java
index dcf4147..a16e456 100644
--- a/Hello/World.java
+++ b/ Hello/World.java
@@ -1,2 +1,2 @@
-
+Sample Commit
World Referring again to FIG. 2, while the first block 210a (e.g., the genesis block) may not be linked to a previous block, the first block 210a may be linked to the second block 210b by the second block 210b storing a hash value (e.g., a secure hash algorithm (SHA) key) corresponding to at least a portion of the contents of the first block 210a. The second block 210b may be further linked to the third block 210c by the third block 210c storing a hash value (e.g., a secure hash algorithm (SHA) key) corresponding to at least a portion of the contents of the second block 210b. In some example embodiments, the second block 210b, the third block 210c, and the fourth block 210d may each correspond to a test that the programming code implementing the software application 135 is required to pass before being deployed to the production system 130. Examples of tests that the programming code may be required to pass prior to deployment may include, compilation tests, unit tests, runtime tests, static code tests, style tests, and/or the like.

For example, the second block 210b may correspond to a first test (e.g., a compilation test) and the third block 210c may correspond to a second test (e.g., a runtime test). Accordingly, the development engine 115 may insert, into the blockchain 120, the second block 210b in response to the programming code having passed the first test. Moreover, the development engine 115 may insert, into the blockchain 120, the third block 210c in response to the programming code having passed the second test. In the event the programming code is required to pass the first test prior to the second test, the development engine 115 may be configured verify that the second block 210b corresponding to the first test is present in the blockchain 120 before inserting the third block 210c in the blockchain 120.

In some example embodiments, the deployment controller 150 may traverse at least a portion of the blockchain 120 in order to determine whether a version of the programming code implementing the software application 135 may be deployed to the production system 130. The deployment controller 150 may traverse the blockchain 120 and identify one or more blocks indicative of the programing code having passed the tests (e.g., compilation test, runtime test, and/or the like) required for deployment to the production system 130. For example, if the programming code is required to pass the first test and the second test before being deployed to the production system 130, the deployment controller 150 may traverse the blockchain 120 and determine, based at least on the blockchain 120 including the second block 210b, that the programming code has passed the first test (e.g., compilation test) required for deployment to the production system 130. Alternatively and/or additionally, the deployment controller 150 may traverse the blockchain 120 and determine, based at least on the blockchain 120 including the third block 210c, that the programming code has passed the second test (e.g., runtime test) required for deployment to the production system 130.

In instances where the development engine 115 verifies that the second block 210b corresponding to the first test is present in the blockchain 120 before inserting the third block 210c in the blockchain 120, the deployment controller 150 may determine, based on the presence of the third block 210c in the blockchain 120, that the programming code implementing the software program 135 may be deployed to the production system 130. The verification performed by the development engine 115 may obviate the deployment controller 150 having to traverse the blockchain 120 to identify a block for every test required for deployment of the programming code. Instead, the deployment controller 150 may determine, based at least on the presence of a block corresponding to a last test in a series of test required for deploying the programming code, that the programming code may be deployed to the production system 130. Nevertheless, the deployment controller 150 may still traverse the blockchain 120 up to the first block 210a (e.g., the genesis block) in order to trace the last test in the series of test required for deploying the programming code.

Figure 3A:
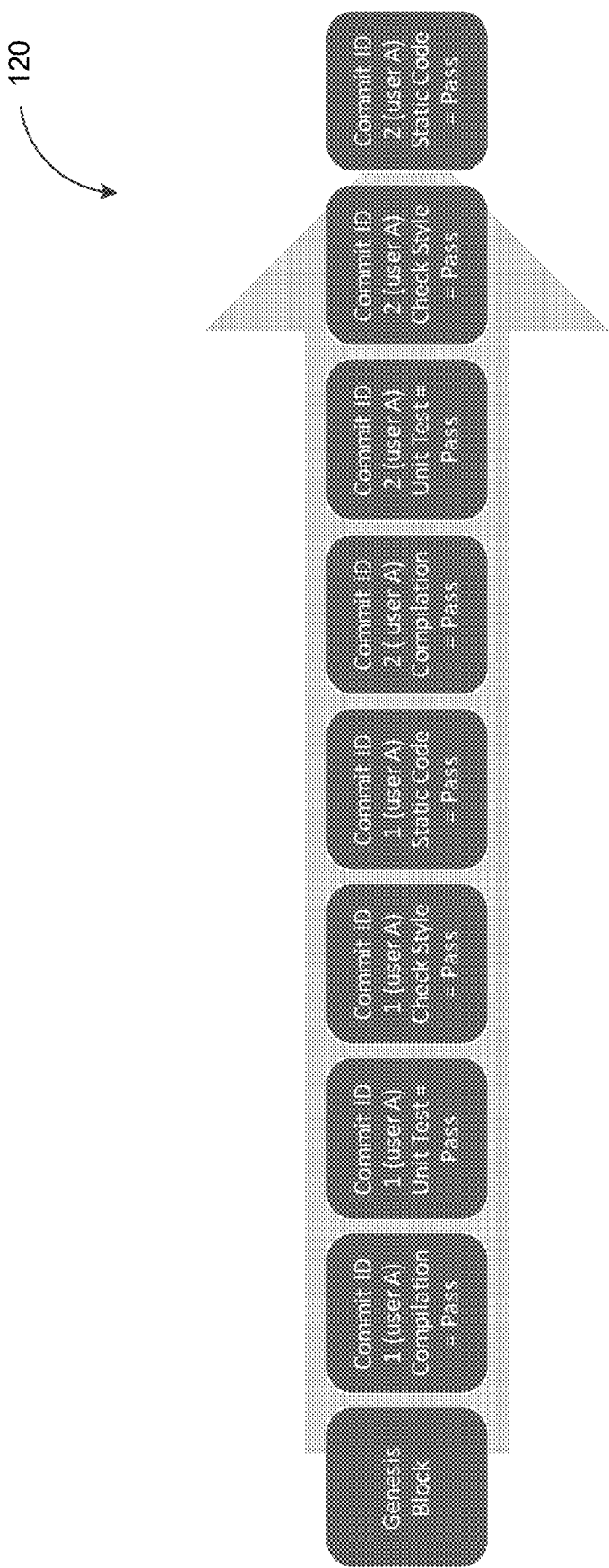
FIG. 3A depicts an example of a blockchain including blocks associated with a single user, in accordance with some example embodiments.
Figure 3B:
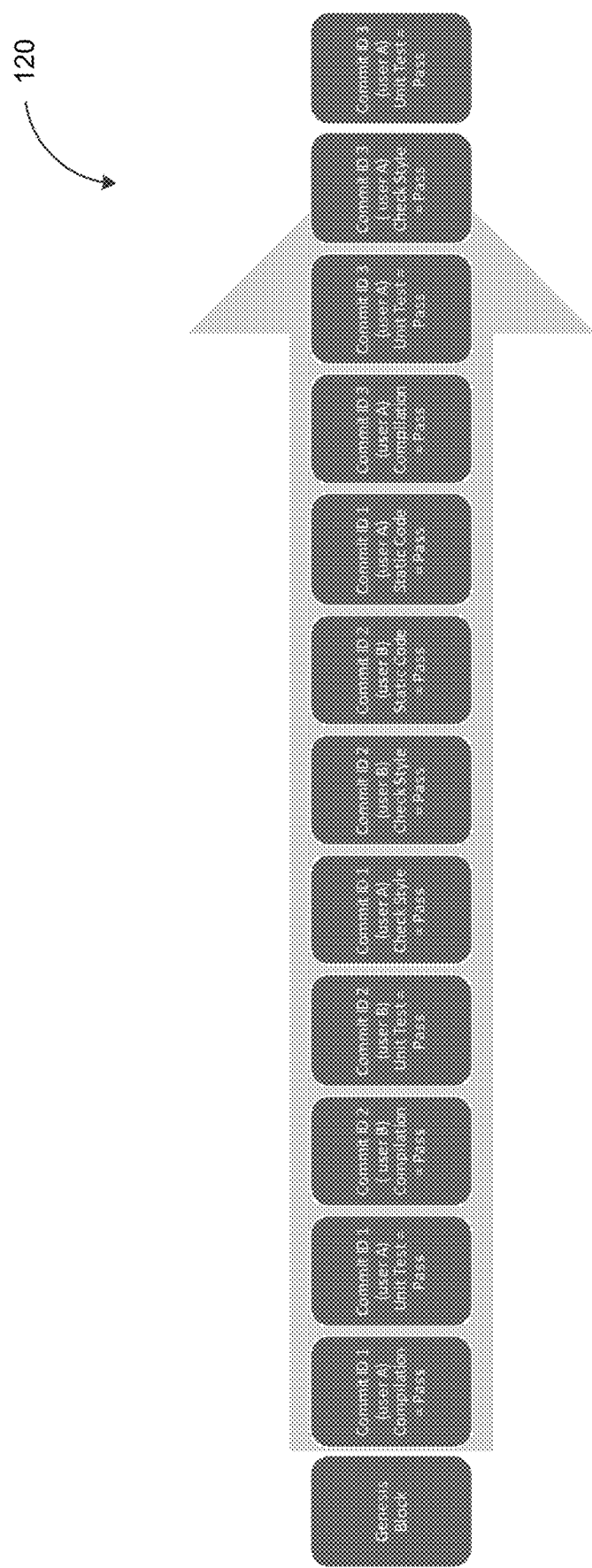
FIG. 3B depicts an example of a blockchain including blocks associated with multiple users, in accordance with some example embodiments.

In some example embodiments, one or more users may collaborate in order to develop the programming code implementing the software program 135. For example, a first user 145a at the first client 140a and a second user 145b at the second client 140b may collaborate in order to develop, at the development system 110, the programming code implementing the software program 135. Accordingly, the blockchain 120 may be configured to track the testing of programming code developed by a single user and/or by multiple users. To further illustrate, FIG. 3A depicts an example of the blockchain 120 in which the blocks are associated with programming code developed by a single user (e.g., User A). FIG. 3B depicts another example of the blockchain 120 in which the blocks in the blockchain 120 are associated with multiple users (e.g., User A and User B). For instance, as shown in FIG. 3B, the blocks in the blockchain 120 may corresponding to a first programming code associated with a first user (e.g., User A) and a second programming code associated with a second user (e.g., User B). moreover, the blocks in the blockchain 120 may also correspond to multiple programming code associated with a single user including, for example, the first programming code (e.g., Commit ID 1) as well as a second programming code (e.g., Commit ID 2) associated with the first user (e.g., User A).

Figure 4A:
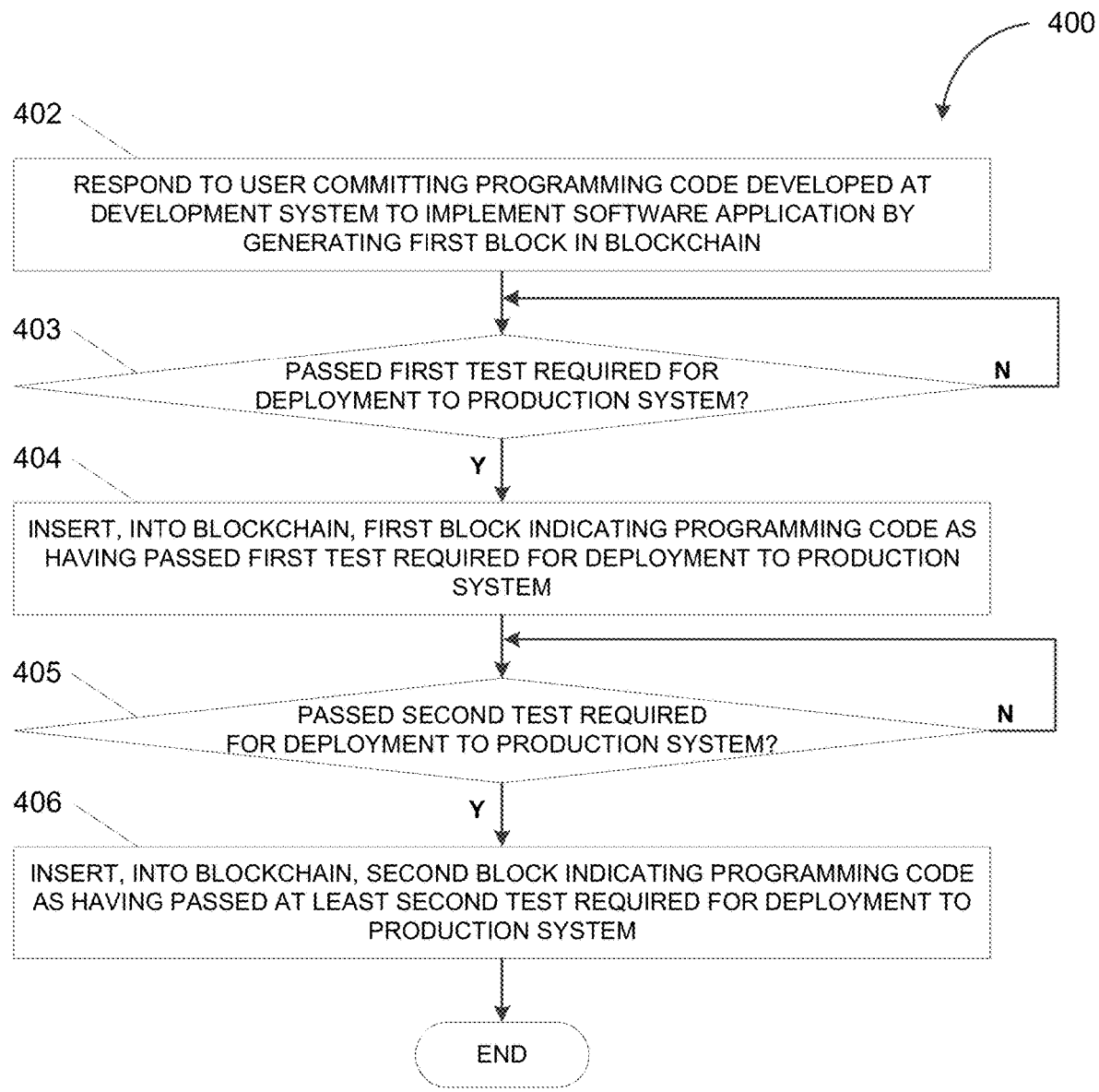
FIG. 4A depicts a flowchart illustrating an example of a process for testing programming code implementing a software application, in accordance with some example embodiments.

FIG. 4A depicts a flowchart illustrating an example of a process 400 for testing programming code implementing a software application, in accordance with some example embodiments. Referring to FIGS. 1-2, 3A-B, and 4A, the process 400 may be performed by the development engine 115 in order to track the testing of the programming code implementing the software program 135 at the development system 110. The deployment of the software program 135 to the production system 130 may be contingent upon the programming code passing one or more tests including, for example, compilation tests, unit tests, runtime tests, static code tests, style tests, and/or the like.

At 402, the development engine 115 may respond to a user committing programming code developed at the development system 110 to implement the software program 135 by at least generating the first block 210a in the blockchain 120. For example, the first user 145a at the first client 140a and/or the second user 145b at the second client 140b may develop, at the development system 110, one or more versions of the programming code implementing the software program 135. Each version of the programming code may include one or more customizations and/or updates to the software application 135. Once the development of a version of the programming code is complete, the first user 145a and/or the second user 145b may commit, at the development system 110, that version of the programming code. To enable differentiation between different versions of the programming code, each version of the programming code may be associated with a unique commit identifier. In response to the first user 145a and/or the second user 145b committing a version of the programming code, the development engine 115 may generate an initial block of a blockchain tracking the testing of that version of the programming code. For instance, as shown in FIG. 2, the development engine 115 may generate the first block 210a, which may be a genesis block of the blockchain 120.

At 403, the development engine 115 may determine whether the programming code passed a first test required for deployment to the production system 130. For example, the development engine 115 may determine whether the programming code implementing the software program 135 passed a compilation test (or a different test) required for deployment to the production system 130. In some example embodiments, at least a portion of the testing of the programming code may be performed at the development system 110 instead of a remote testing environment (e.g., the production system 130) in order to minimize the resources associated with testing the programming code.

At 403-N, if the development engine 115 determines that the programming code failed to passed the first test, the process 400 may continue at 403 and the development engine 115 may continue to determine whether the programing code passed the first test required for deploying the programming code to the production system 130. In some example embodiments, passing the first test may be a prerequisite for the second test. For example, the programming code may be required to pass at least a compilation test before undergoing one or more runtime tests. Accordingly, the development engine 115 may continue to determine whether the programming code passed the first test. The development engine 115 may not determine whether the programing code has passed subsequent tests until the development engine 115 determines that the programming has passed the first test.

Alternatively, at 403-Y, the development engine 115 may determine that the programming code passed the first test required for deploying the programming code to the production system 130. Accordingly, at 404, the development engine 115 may insert, into the blockchain 120, the second block 210b indicating that the programming code has passed the first test required for deployment to the production system 130. The process 400 may continue at operation 405 in which the development engine 115 determines whether the programming code passed at least a second test required for deploying the programming code to the production system 130.

For example, once the development engine 115 determines that the programming code has passed the compilation test, the development engine 115 may insert, into the blockchain 120, the second block 120b indicating that the programming code has passed the compilation test. Since passing the compilation test is a prerequisite for subsequent runtime tests, the development engine 115 may determine whether the programming code passed one or more runtime tests once the development engine 115 determines that the programming code has passed the compilation test and inserted a corresponding block into the blockchain 120.

At 405-N, the development engine 115 may determine that the programming code failed to pass at least the second test required for deploying the programming code to the production system 130. Accordingly, the process 400 may continue at 405 and the development engine 115 may continue to determine whether the programming code passed at least the second test required for deploying the programing code to the production system 130. For example, in the event the programming code did not pass any of the runtime tests required for deployment to the production system 130, the development engine 110 may continue to determine whether the programming code passes the runtime tests.

Alternatively, at 405-Y, the development engine 115 may determine that the programming code passed at least the second test required for deploying the programming code to the production system. At 406, in response to determining that the programming code passed at least the second test, the development engine 115 may insert, into the blockchain 120, at least the third block 210c indicating that the programming code has passed at least the second test. For example, once the development engine 115 determines that the programming code has passed the runtime tests required for deployment to the production system 130, the development engine 115 may insert, into the blockchain 120, the third block 210c and/or the fourth block 210d indicating that the programming code has passed the runtime tests required for deployment to the production system 130. In some instances, the presence of the third block 210c and/or the fourth block 210d may be sufficient to indicate that the programming code has passed every test required for deployment to the production system 130. Accordingly, the process 400 may terminate once the development engine 115 inserts at least the third block 210c indicating the programming code as having passed at least the second test required for deploying the programming code to the production system 130.

Figure 4B:
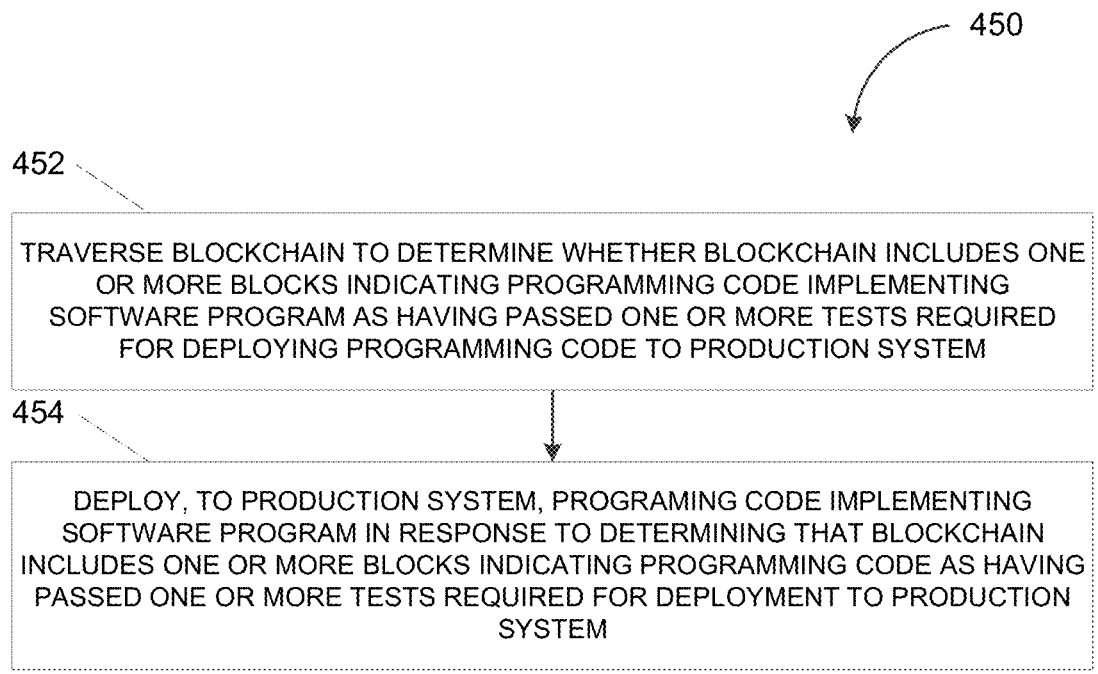
FIG. 4B depicts a flowchart illustrating an example of a process for deploying programing code implementing a software application, in accordance with some example embodiments.

FIG. 4B depicts a flowchart illustrating an example of a process 450 for deploying programming code implementing a software application, in accordance with some example embodiments. Referring to FIGS. 1-2, 3A-B, and 4B, the process 450 may be performed by the deployment controller 150 in order to determine whether the programming code implementing the software program 135 may be deployed to the production system 130. As noted, deployment of the programming code may be contingent upon the programming code passing one or more tests including, for example, compilation tests, unit tests, runtime tests, static code tests, style tests, and/or the like.

At 452, the deployment controller 150 may traverse the blockchain 120 to determine whether the blockchain 120 includes one or more blocks indicating the programming code implementing the software program 135 as having passed one or more tests required for deployment to the production system 130. For example, in order to be deployed to the production system 130, the programming code implementing the software program 135 may be required to pass a first test as well as a second test. In some example embodiments, the deployment controller 150 may traverse the blockchain 120 to identify the second block 210b indicating that the programming code has passed the first test. Alternatively and/or additionally, the deployment controller 150 may traverse the blockchain 120 to identify the third block 210c indicating that the programming code has passed the second test. The presence of the second block 210b and/or the third block 210c may indicate that the programming code implementing the software program 135 may be deployed to the production system 130.

In some instance, the development engine 115 may not insert the third block 210c into the blockchain 120 without having first verified the presence of the second block 210b indicating that the programming code has passed the first test that is a prerequisite to the second test. Accordingly, the deployment controller 150 may determine to deploy the programming code without having to verify the presence of the second block 210b. Instead, verifying the presence of the third block 210c corresponding to having passed the second test may be sufficient to trigger the deployment of the programming code to the production system 130.

At 454, the deployment controller 150 may deploy, to the production system 130, the programming code implementing the software program 135 in response to determining that the blockchain 120 includes one or more blocks indicating the programming code as having passed one or more tests required for deployment to the production system 130. For example, the programming code may be deployed to the production system 130 in order to implement one or more customizations and/or updates to the software program 135. Once deployed to the production system 130, the functionalities of the software application 135, including the customizations and/or updates, may be accessible for use from multiple clients.

Figure 5:
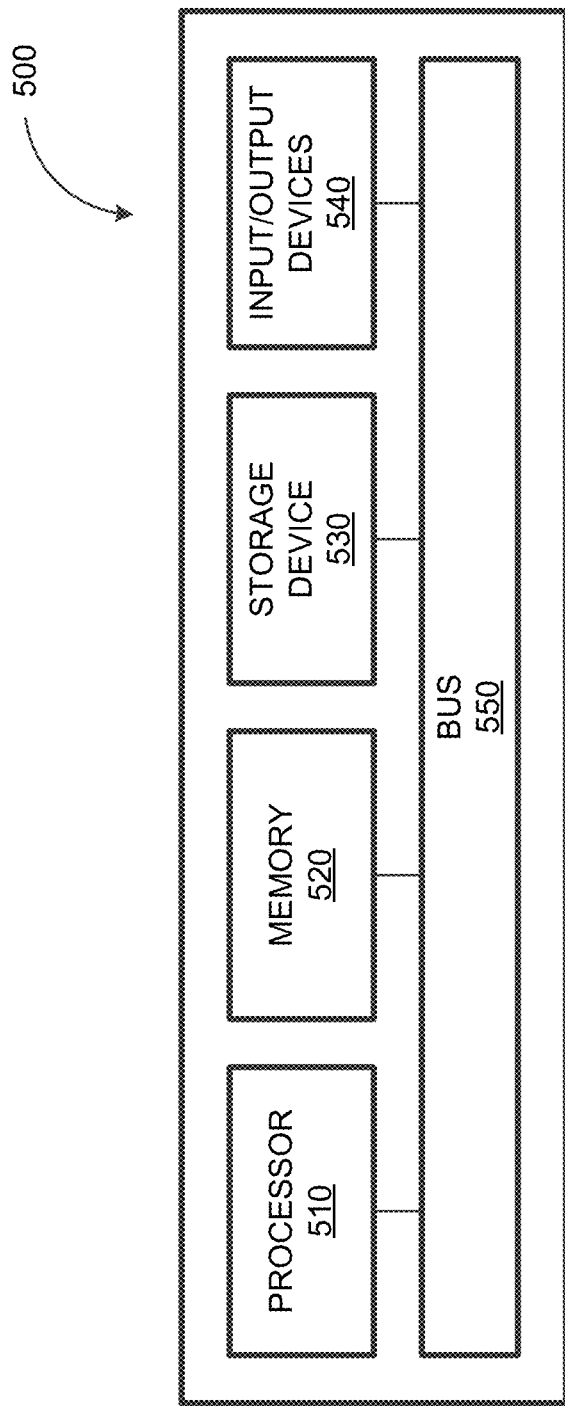
FIG. 5 depicts a block diagram illustrating an example of a computing system, in accordance with some example embodiments.

FIG. 5 depicts a block diagram illustrating a computing system 500 consistent with implementations of the current subject matter. Referring to FIGS. 1-5, the computing system 500 can be used to implement the development engine 115, the deployment controller 150, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the development engine 115, the deployment controller 150, and/or the like. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid-state device, a floppy disk device, a hard disk device, an optical disk device, a tape device, and/or any other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one data processor; and
    at least one memory storing instructions, which when executed by the at least one data processor, result in operations comprising:
        in response to a first user committing a first programming code, determining whether the first programming code passed a plurality of tests required for deploying the first programming code to a production system;
        in response to determining that the first programming code passed the plurality of tests, inserting, into a blockchain, a first block in response to determining that the first programming code has passed a first test of the plurality of tests required for deploying the first programming code to the production system;
        inserting, into the blockchain, a second block in response to determining that the first programming code has passed a second test of the plurality of tests required for deploying the first programming code to the production system, the first test comprising a prerequisite for the second test, and the second block is inserted into the blockchain further in response to verifying that the first block corresponding to the first test is present in the blockchain; and
        deploying, to the production system, the first programming code, the deploying of the first programming code includes traversing the blockchain to verify a presence of a plurality of blocks corresponding to the plurality of tests required for deploying the first programming code to a production system.

2. The system of claim 1, wherein each of the plurality of blocks include a commit identifier identifying at least one of the first programming code and a version of the first programming code.

3. The system of claim 2, wherein the traversing of the blockchain includes identifying, based at least on the commit identifier, the one or more blocks that are associated with at least one of the first programming code and the version of the first programming code.

4. The system of claim 1, wherein each block in the blockchain is cryptographically linked to a preceding block by including a hash value corresponding to at least a portion of a content of the preceding block.

5. The system of claim 1, wherein the plurality of tests include one or more compilation tests, unit tests, runtime tests, static code tests, or style tests.

6. The system of claim 1, wherein the plurality of tests are performed at a development system associated with the first programming code.

7. The system of claim 1, wherein the blockchain further includes one or more blocks corresponding to a second programming code associated with a second user.

8. The system of claim 1, wherein the first programming code implements at least one of a software application, a customization of the software application, and an update to the software application.

9. A computer-implemented method, comprising:
    in response to a first user committing a first programming code, determining whether the first programming code passed a plurality of tests required for deploying the first programming code to a production system;
    in response to determining that the first programming code passed the plurality of tests, inserting, into a blockchain, a first block in response to determining that the first programming code has passed a first test of the plurality of tests required for deploying the first programming code to the production system;
    inserting, into the blockchain, a second block in response to determining that the first programming code has passed a second test of the plurality of tests required for deploying the first programming code to the production system, the first test comprising a prerequisite for the second test, and the second block is inserted into the blockchain further in response to verifying that the first block corresponding to the first test is present in the blockchain; and
    deploying, to the production system, the first programming code, the deploying of the first programming code includes traversing the blockchain to verify a presence of a plurality of blocks corresponding to the plurality of tests required for deploying the first programming code to a production system.

10. The method of claim 9, wherein each of the plurality of blocks include a commit identifier identifying at least one of the first programming code and a version of the first programming code.

11. The method of claim 10, wherein the traversing of the blockchain includes identifying, based at least on the commit identifier, the one or more blocks that are associated with at least one of the first programming code and the version of the first programming code.

12. The method of claim 9, wherein each block in the blockchain is cryptographically linked to a preceding block by including a hash value corresponding to at least a portion of a content of the preceding block.

13. The method of claim 9, wherein the plurality of tests include one or more compilation tests, unit tests, runtime tests, static code tests, or style tests.

14. The method of claim 9, wherein the plurality of tests are performed at a development system associated with the first programming code.

15. The method of claim 9, wherein the blockchain further includes one or more blocks corresponding to a second programming code associated with a second user.

16. A non-transitory computer readable medium storing instructions, which when executed by at least one data processor, result in operations comprising:
    in response to a first user committing a first programming code, determining whether the first programming code passed a plurality of tests required for deploying the first programming code to a production system;
    in response to determining that the first programming code passed the plurality of tests, inserting, into a blockchain, a first block in response to determining that the first programming code has passed a first test of the plurality of tests required for deploying the first programming code to the production system;

inserting, into the blockchain, a second block in response to determining that the first programming code has passed a second test of the plurality of tests required for deploying the first programming code to the production system, the first test comprising a prerequisite for the second test, and the second block is inserted into the blockchain further in response to verifying that the first block corresponding to the first test is present in the blockchain; and deploying, to the production system, the first programming code, the deploying of the first programming code includes traversing the blockchain to verify a presence of a plurality of blocks corresponding to the plurality of tests required for deploying the first programming code to a production system.

* * * * *